Nov. 30, 1971      G. H. RODE      3,623,259
FISHING ROD AGITATOR
Filed July 25, 1968
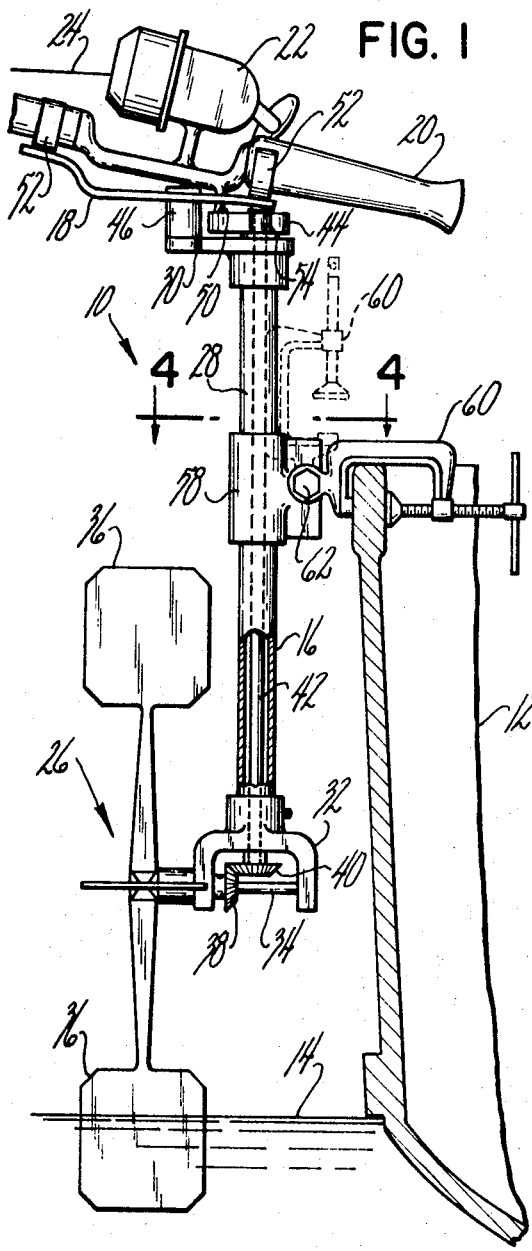
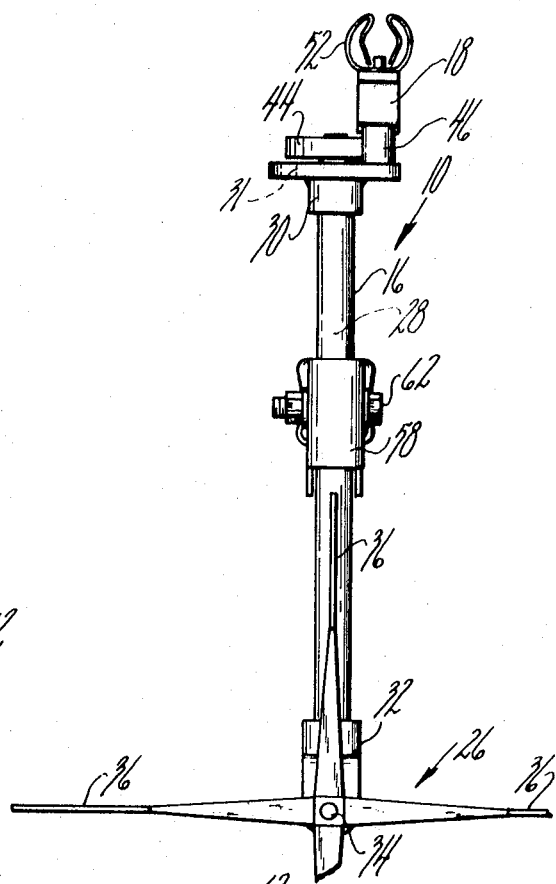
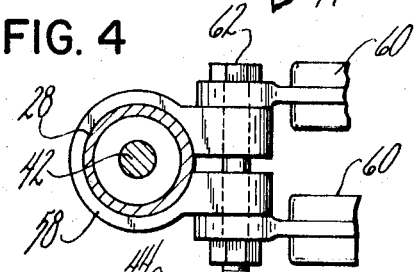
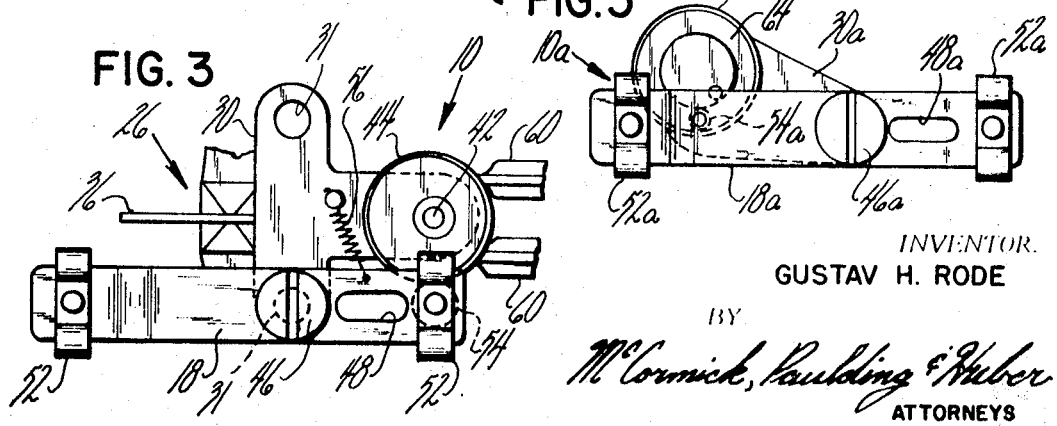
INVENTOR.
GUSTAV H. RODE
BY McCormick, Paulding & Huber
ATTORNEYS

United States Patent Office 3,623,259
Patented Nov. 30, 1971

3,623,259
FISHING ROD AGITATOR
Gustav H. Rode, Ridge Road, Terryville,
Plymouth, Conn. 06782
Filed July 25, 1968, Ser. No. 747,626
Int. Cl. A01k 87/00
U.S. Cl. 43—19.2                    16 Claims

ABSTRACT OF THE DISCLOSURE

A device for agitating a fishing pole in response to the relative movement of a body of water includes a water wheel journalled at the lower end of a generally vertically disposed support member adapted for attachment to a boat or the like. The water wheel is drivingly connected to a lever pivotally mounted at the upper end of the support member and oscillates the lever in response to relative movement of the water. Clips on the lever are adapted to engage and releasably retain the handle of a fishing rod to support the rod in a conventional fishing position.

BACKGROUND OF INVENTION

This invention relates in general to fishing apparatus and deals more particularly with an improved device for releasably retaining and continuously agitating a fishing rod in response to relative movement of the body of water.

The general aim of the present invention is to provide a device for attachment to a boat or a dock to effect agitation of a fishing rod in response to the relative movement of a body of water and thereby animate a fishing lure or other bait attached to a fishing line associated with the rod. A further object of the invention is to provide a device of the aforedescribed character which will not interfere with normal operation of a fishing reel attached to the rod. Still another object of the invention is to provide a rod agitating device from which a fishing rod may be readily detached when a fish has taken the bait to enable a fisherman to reel in the fish unhindered by the device.

Other objects and advantages of the invention will be apparent from the following description and from the drawing forming a part thereof.

BRIEF DESCRIPTION OF DRAWING

FIG. 1 is a side elevational view of a device embodying the invention shown attached to the side of a boat in an outboard position and supporting a fishing rod.

FIG. 2 is a front elevational view of the device of FIG. 1.

FIG. 3 is a plan view of the device of FIG. 1.

FIG. 4 is a somewhat enlarged fragmentary sectional view taken along the line 4—4 of FIG. 1.

FIG. 5 is generally similar to FIG. 3 but shows another embodiment of the invention.

DETAILED DESCRIPTION OF PREFERRED EMBODIMENT

Turning now to the drawing, a device embodying the present invention and indicated generally at 10 is shown attached to a gunwale of a boat 12 floating in a body of water 14. The device 10 generally comprises a support member 16 which has an agitator 18 pivotally mounted at its upper end for supporting a fishing rod 20 which includes a reel 22 for controlling a fishing line 24. The agitator 18 is arranged to oscillate in response to rotation of a rotor or water wheel indicated generally at 26 journalled at the lower end of the support member 16 and at least partially submerged in the water.

The support member may take various forms but preferably and as shown the support member 16 has a vertically extending tubular body 28 and includes a bracket 30 secured to the upper end thereof. The bracket 30 is generally T-shaped as viewed from above and has an internally threaded opening 31 in each of its free ends as best shown in FIG. 3. Fastened to the lower end of the body 28 is a yoke 32.

The water wheel 26 is supported for rotation about a generally horizontal axis by a shaft 34 journalled in the yoke 32 and includes a circumaxially spaced series of paddle blades 36, 36. Preferably and as shown the water wheel 26 has four paddle blades with blade surfaces thereof generally disposed in the plane of its axis. A bevel gear 38 secured to the shaft 34 intermeshes with another bevel gear 40 on the lower end of a drive shaft 42 which extends upwardly through the yoke 32, the body 38 and the bracket 30. Near its upper and lower ends the shaft is journalled in bushings respectively carried by the bracket 30 and the yoke 32. On the upper end of the drive shaft 42 a generally circular cam 44 is eccentrically mounted to oscillate the agitator 18 in response to rotation of the water wheel 26.

Considering the agitator in further detail and referring now particularly to FIG. 3, the agitator 18 generally comprises an elongated lever pivoted intermediate its ends on a stud 46 threadably received in one of the openings 31. The outboard end of the lever 18 is upwardly offset from the inboard end thereof to support the fishing rod 20 in a normal fishing position slightly upwardly inclined from the horizontal as shown in FIG. 1. Inboard of the stud 46 is an elongated slot 48 which is formed in the lever 18 to accommodate a finger grip on a fishing rod such as indicated at 50 in FIG. 1. Generally U-shaped upwardly opening spring clips 52, 52 secured to the ends of the lever 18 receive and releasably grip the handle of the fishing rod 20 at spaced points so that the rod may be readily removed from the device. It should be noted that the aforedescribed rod supporting structure is so arranged that the reel 22 may be operated in its usual manner unhampered by the device 10.

Driving connection between the eccentric cams 44 and the lever 18 is provided by a roller follower 54 secured to the lower side of the lever 18 in axially parallel relation to the drive shaft 42 and in spaced relation to the stud 46 for engaging the cam 44.

The device 10, as shown, is arranged for mounting on the port side of the boat 12, consequently, the stud 46 is positioned with respect to the bracket 30 to support the lever 18 and its associated follower 54 rearwardly of the cam 44. The flow of water rearwardly relative to the boat tends to exert a rearwardly force or drag on the fishing line 24 which in turn tends to bias the follower 54 toward the cam 44 as it appears in FIG. 3. It has been found that this drag is generally sufficient to maintain the follower 54 in engagement with the cam 44. However, preferably a light spring is provided to positively bias the follower into engagement with the cam. In the illustrated embodiment 10 a tension spring 56 connected between the bracket 30 and the outboard end of the lever 18 is provided for this purpose as shown in FIG. 3. However, if desired a torsion spring (not shown) associated with the stud 46 and engaging the lever 18 may also be employed for this purpose. When the device is to be mounted on the starboard side of a boat the stud 46 is threaded into the other opening 31 at the opposite free end of the bracket 30.

Provision is made for adjustably mounting the device 10 on a boat or dock so that the water wheel 26 may be adjusted to a submerged position commensurate to efficient operation. A split collar 58 surrounds the body 28 intermediate the bracket 30 and the yoke 32 and carries a pair of spaced apart C clamps 60, 60 which are secured thereto by a fastener or bolt 60. It should be noted that the C clamps 60, 60 are arranged to pivot or swivel on the bolt 62 for adjustment to various angular positions relative to the collar 58. Thus, the clamps 60, 60 may be adjusted through a range of angular positions to the position as shown in broken lines in FIG. 1 so that the device 10 may be clamped to a horizontally extending support member such as the marginal edge of a dock or the like. When the bolt 62 is loosened the body may be slidably adjusted relative to the collar so that the device 10 may be properly positioned relative to the water to effect efficient operation.

Referring now to FIG. 5 another embodiment of the invention is indicated generally at 10a and is similar in most respects to the embodiment 10 previously described but differs therefrom in the arrangement of the drive connection between the lever and cam mechanism. The embodiment 10a includes a lever 18a carrying spring clips 52a, 52a and substantially identical in all respects to the lever previously described and bearing the same reference numeral. Support for the lever is provided by a bracket 30a which extends radially outwardly from the tubular body of the device and threadably receives a stud 46a upon which the lever is pivoted. The bracket 30a is received on the upper end of the tubular body generally as shown in the previously described embodiment 10, however, the latter bracket is angularly adjustable relative to the body so that the position of the lever 18a may be adjusted relative to the water wheel. The device 10a also includes an eccentrically mounted circular cam 44a, however, this cam differs from the cam 44 previously described in that it has an annular cam groove 64 opening through the upper surface thereof. A roller follower 54a secured to the lower surface of the lever 18a is received and retained in the cam groove 64 to provide positive drive connection between the lever 18a and the eccentric cam 44a. Thus the need for a spring or special bracket arrangement to maintain the follower in engagement with its driving cam is wholly eliminated.

The drawing shows preferred embodiments of the invention and such embodiments have been described, but it will be understood that various changes may be made from the constructions disclosed and that the drawings and description are not to be construed as defining or limiting the scope of the invention, the claims forming a part of this specification being relied upon for that purpose.

What is claimed is:

1. A device for agitating a fishing rod in response to the relative movement of a body of water, said device comprising a support member, agitating means carried by said support member above the surface of the water and arranged for movement relative to said support member, retaining means for releasably securing the fishing rod to said agitating means, and driving means at least partially submersible in the water and operably connected to said agitating means for moving the latter means in response to movement of the water relative to said driving means.

2. A device for agitating a fishing rod as set forth in claim 1 wherein said driving means comprises a rotor journalled for rotation relative to said support member.

3. A device for agitating a fishing rod as set forth in claim 2 wherein said rotor is a paddle wheel journalled for rotation about a generally horizontal axis and having a circumaxially spaced series of paddle blades thereon.

4. A device for agitating a fishing rod as set forth in claim 1 wherein said agitating means comprises a lever pivotally mounted on said support member for oscillation relative thereto.

5. A device for agitating a fishing rod as set forth in claim 4 wherein said driving means includes a rotary cam supported for rotation relative to said support member and a cam follower associated with said lever and engaging said cam.

6. A device for agitating a fishing rod as set forth in claim 5 wherein said cam has a groove formed therein and said follower is received in said groove.

7. A device for agitating a fishing rod as set forth in claim 5 including means for biasing said follower into engagement with said cam.

8. A device for agitating a fishing rod as set forth in claim 4 wherein said retaining means comprises at least one spring clip attached to said lever and adapted to releasably engage the handle of the fishing rod.

9. A device for agitating a fishing rod as set forth in claim 4 wherein said support member is disposed in a generally vertical plane and said lever is pivotally mounted on said support member for oscillation in a generally horizontal plane.

10. A device for agitating a fishing rod as set forth in claim 1 including mounting means for releasably securing said support means to a part of a boat or the like.

11. A device for agitating a fishing rod as set forth in claim 10 wherein said drive means is carried by said support member and said support member is vertically adjustable relative to said mounting means.

12. A device for agitating a fishing rod as set forth in claim 10 wherein said mounting means is angularly adjustable relative to said support member.

13. A device for agitating a fishing rod as set forth in claim 1 wherein said support member includes an elongated generally vertically disposed body portion, said agitating means comprises a lever pivotally supported at the upper end of said body portion, and said drive means comprises a rotor journalled for rotation at the lower end of said support member, a rotary cam operably connected to said rotor and journalled at the upper end of said support member and a cam follower associated with said lever and engaging said cam for moving said lever in response to rotation of said rotor.

14. A device for agitating a fishing rod as set forth in claim 13 wherein said drive means icnludes a pair of shafts and a pair of gears providing driving connection between said shafts, said shafts providing operable connection between said rotary cam and said rotor.

15. A trolling device comprising, a support for attachment at the side of a boat, a rotatable shaft carried by the support, propelling means carried by the shaft and entrant into the water and rotative by forward movement of the boat therein, a rod support and means connecting said rod support to the shaft and by which an oscillating movement is imparted to the rod support by movement of the boat through the water.

16. A device for agitating a fishing rod as set forth in claim 1 wherein said driving means is operably connected to said agitating means for continuously moving the latter means in response to movement of the water relative to the driving means.

References Cited

UNITED STATES PATENTS

| | | | |
|---|---|---|---|
| 2,643,478 | 6/1953 | Paulsen | 43—19.2 |
| 2,691,234 | 10/1954 | Riley | 43—26.2 |
| 2,030,875 | 2/1936 | Johnson | 242—84.1 |
| 3,422,561 | 1/1969 | McLean | 43—19.2 |

WARNER H. CAMP, Primary Examiner